United States Patent [19]

Stüwe

[11] 4,226,919
[45] Oct. 7, 1980

[54] HYDROGEN/OXYGEN FUEL CELL

[75] Inventor: Botho Stüwe, Fürth, Fed. Rep. of Germany

[73] Assignee: Siemens Aktiengesellschaft, Munich, Fed. Rep. of Germany

[21] Appl. No.: 64,887

[22] Filed: Aug. 8, 1979

[30] Foreign Application Priority Data

Aug. 21, 1978 [DE] Fed. Rep. of Germany ....... 2836464

[51] Int. Cl.$^2$ ............................................. H01M 8/04
[52] U.S. Cl. ............................................................ 429/25
[58] Field of Search ..................................... 429/25, 22

[56] References Cited

U.S. PATENT DOCUMENTS

| | | | |
|---|---|---|---|
| 3,106,494 | 10/1963 | Thorsheim | 429/25 |
| 3,935,028 | 1/1976 | Strasser et al. | 429/14 |
| 4,098,960 | 7/1978 | Gagnon | 429/25 |

Primary Examiner—Charles F. LeFevour
Attorney, Agent, or Firm—Kenyon & Kenyon

[57] ABSTRACT

The present invention relates to hydrogen/oxygen fuel cells having oxygen and hydrogen feed lines for the flow of hydrogen and oxygen gases into the fuel cell, each of which is provided with a diaphragm valve for regulating the flow of gases therethrough, and each having control lines for controlling each diaphragm, the fuel cell also having the oxygen control line connected to the hydrogen feed line, and having an oxygen control valve positioned in the oxygen control line, to regulate the flow of hydrogen gas therethrough.

3 Claims, 1 Drawing Figure

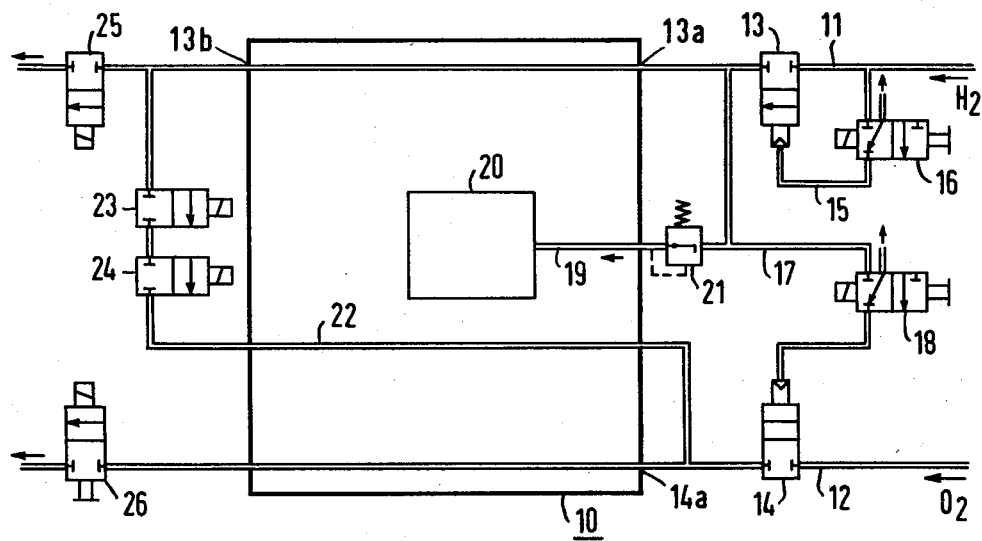

HYDROGEN/OXYGEN FUEL CELL

BACKGROUND OF THE INVENTION

1. Field of the Invention

The invention relates to a novel hydrogen/oxygen fuel cell. More particularly, this invention relates to a hydrogen/oxygen fuel cell having a novel valving system for controlling the flow of gaseous fuel into the cell.

2. Prior Art

A fuel cell assembly for generating electrical energy by reacting gaseous reactants with a liquid electrolyte are well known in the art. For example, such cells are described in detail in German Pat. No. 2,129,134 and U.S. Pat. No. 3,935,028. In these known fuel cell assemblies, diaphragm valves are arranged in the working lines which are the feed lines for the gaseous reactants. In addition, a control line containing a pneumatic valve and a reducing valve are provided for feeding one of the gaseous reactants from the corresponding working line to an electrolyte regenerator. This control line also includes a magnetic valve which is positioned between the pneumatic valve and the reducing valve. The magnetic valve responds to the lower voltage limit of the fuel cell. The two diaphragm valves in each of the feed lines are connected to this magnetic valve, which provides control lines for the diaphragm valves.

When starting up hydrogen/oxygen fuel cell assemblies, because of the danger of oxidative damage to the hydrogen electrodes and catalysts, it is desirable to first feed the hydrogen to the fuel cell and then the gaseous oxidant. In known hydrogen/oxygen fuel cells, this is achieved by preceding the diaphragm valve for the oxidant in the respective control line by a choke. The choke causes the diaphragm valve for the oxidant to open later than the diaphragm valve for the gaseous fuel, whereby the desired purpose is achieved.

These known hydrogen/oxygen fuel cells suffer from a number of disadvantages that interfere with their effectiveness. For example, while theoretically a solution to the problem, control of the oxygen gas flow by means of a choke nozzle is difficult to realize in practice and in addition, proper operation cannot be assured with a certainty. This is because the volume of the control line from the choke nozzle to the oxygen diaphragm valve including the diaphragm space is relatively small, and, therefore, the opening pressure of the oxygen diaphragm valve is reached very quickly through the inflowing hydrogen control gas. In addition, if an appreciable difference in the opening instant of the hydrogen and the oxygen diaphragm valve is desired, then the diameter of the choke nozzle can only be about 0.03 to 0.1 mm, depending on the delay time desired. Such nozzles, however, not only are difficult to make in a reproducible manner, but they also require the use of a filtered gas because otherwise, they clog up easily. The known hydrogen/oxygen fuel cell has the further diadvantage that oxygen would flow into the battery even if the hydrogen diaphragm valve does not open, which could result in oxidative damage to the hydrogen electrodes and the catalyst.

It is therefore an object of the invention to provide a hydrogen/oxygen fuel cell with feed lines, diaphragm valves and control lines for the oxygen and hydrogen gases such that the hydrogen pressure prevailing in the cell is always higher than the oxygen pressure.

It is another object of this invention to provide a control for the inflow of hydrogen and oxygen gases so that oxidative damage to the hydrogen electrode and the catalyst will be prevented.

Other objects and advantages will be apparent to those of skill in the art from a reading of the specification and appended claims.

SUMMARY OF THE INVENTION

These and other objects which are apparent to those to skill in the art from a consideration of the specification and appended claims are achieved by the present invention. This invention provides an improvement in a hydrogen/oxygen fuel cell of the type which generates electric energy through the reaction of gaseous reactants, said fuel cell having a control unit which controls the inflow of gaseous reactants, which includes a feed line for the inflow of hydrogen gas into the fuel cell, a feed line for the inflow of oxygen gas into the fuel cell, a diaphragm valve in the hydrogen feed line, a diaphragm valve in the oxygen feed line; a control line for the hydrogen diaphragm valve, a control line for the oxygen diaphragm valve and an on and off valve for hydrogen in the hydrogen control line. The improvement of this invention comprises having the oxygen control line connected to the hydrogen feed line at a point between the hydrogen diaphragm valve and the hydrogen gas fuel cell inlet, positioning an oxygen control valve in the oxygen control line and by maintaining the opening pressure of the oxygen diaphragm valve at a higher level than the opening pressure of the hydrogen diaphragm valve.

As used herein, "fuel cell" refers to either a single fuel cell, or to an assembly of more than one fuel cells and a complete installation. Such fuel cells with use pure hydrogen gas as one reactant, as well as mixtures of fuel gases such as hydrogen and carbon monoxide, and hydrogen and carbon dioxide. Similarly, "oxygen" means not only pure oxygen but also oxygen-containing gases, such as air.

In the fuel battery according to the invention, the hydrogen always flows into the battery before the oxygen. This is because the pressure of the hydrogen gas is greater than that of the oxygen gas, until the respective nominal pressures are reached. The higher pressure level of the hydrogen as compared to the pressure of the oxygen is obtained because the oxygen control line ties into the hydrogen feed line behind the hydrogen diaphragm valve, which is immediately ahead of the point where the hydrogen feed line enters the fuel cell. This features together with the higher opening pressure of the oxygen diaphragm valve as compared with the opening pressure of the hydrogen diaphragm valve caused the hydrogen chambers of the fuel cell to fill first with hydrogen fuel. The hydrogen chambers fills with hydrogen until the hydrogen gas pressure reaches the opening pressure of the oxygen diaphragm valve, before the oxygen can flow into the oxygen chambers.

The fuel cell according to this invention has the further advantage that the hydrogen pressure is prevented from dropping below a given value during the operation of the cell without the cell being switched off. Because if the pressure of the hydrogen in the hydrogen chamber drops to the closing pressure of the oxygen diaphragm valve, this valve interrupts the oxygen supply to the cell by venting, and the cell is switched off. Therefore, no separate pressure monitor is required for monitoring the hydrogen pressure in the hydrogen chambers.

In the fuel cell according to the invention, the oxygen control valve, also provides that hydrogen flows into the cell longer than oxygen when the cell is switched off. This is because the oxygen diaphragm valve is vented and thereby closed, when the oxygen control valve is switched off. This shuts off the supply of oxygen to the cell, while hydrogen can continue to flow into the cell because all of the valves associated with the inflow of hydrogen gas are open.

As compared to the known fuel cells, the fuel cell according to the invention has the advantage that standard line cross sections are exclusively required. This eliminates many of the problems connected with the use of small choke nozzles. In addition, this invention provides with a certainty that when beginning the operation of the fuel cells of this invention, the hydrogen chambers are filled before the oxygen chambers, which significantly reduces the possibility of oxidative damage to the hydrogen electrode and the catalyst.

BRIEF DESCRIPTION OF THE DRAWINGS

The preferred embodiments of this invention, and the preferred uses thereof, will be described in greater detail in conjunction with the accompanying drawings. It should be appreciated that the means for carrying out the preferred embodiments, exemplified in the drawings are not limiting, but rather are illustrative and representative of many other embodiments which are within the spirit of this invention.

FIG. 1 is a schematic illustration of a fuel cell showing its major components and the oxygen and hydrogen gas feed lines.

DESCRIPTION OF THE PREFERRED EMBODIMENTS

FIG. 1 depicts a modification of a hydrogen/oxygen fuel cell, 10 of a known design, as for example the fuel cell described and claimed in U.S. Pat. No. 3,935,028 to Strasser et al.

The two reaction gases hydrogen and oxygen are fed to the fuel cell 10 via hydrogen feed line 11 and oxygen feed line 12. Hydrogen diaphragm valve 13 is positioned in the hydrogen feed line 11, and oxygen diaphragm valve 14 is positioned in the oxygen feed line 12. The two diaphragm valves 13 and 14 are actuated pneumatically. Hydrogen control valve 16 is positioned in hydrogen control line 15. One end of hydrogen control line 15 connects with hydrogen feed line 11 downstream of hydrogen diaphragm valve 13, and the other end connects with hydrogen feed line 11 by way of diaphragm valve 13 upstream of its downstream connection. Oxygen control line 17, in which an on/off oxygen control valve 18 is positioned, connects the oxygen diaphragm valve 14 to the hydrogen feed line 11. The oxygen control line 17 leads into the hydrogen feed line 11 at a point between the hydrogen diaphragm valve 13 and the fuel cell inlet 13a which is upstream from the hydrogen diaphragm valve 13 and before the hydrogen feed line 11 enters the fuel cell 10. Three-way electromagnetic valves are used as the control valves 16 and 18, and they are generally manually operated. Preferably, electromagnetic valves of the type proposed in German Offenlegungsschrift No. 2,736,032 are used as control valves.

At a point between the oxygen control valve 18 and the point at which oxygen control line 17 connects with hydrogen feed 11, one end of a pressure line 19 connects with the oxygen control line 17. The other end of the pressure line 19 connects with an electrolyte regenerator 20 thereby providing communication between oxygen control line 17 and electrolyte regenerator 20. The electrolyte regenerator 20 which in this embodiment is in the form of a so-called gap evaporator is preferably of a known design, as for example, the design described and claimed in German Pat. No. 2,129,134. A reducing valve 21 is arranged in the pressure line 19.

Line 22 establishes a connection between the hydrogen feed line 11 and oxygen feed line 12. One end of line 22 connects with oxygen feed line 12 at a point upstream of oxygen diaphragm 14, and downstream of oxygen feed line inlet 14a. The other end of line 22 connects with hydrogen feed line 11 at a point upstream from hydrogen feed line outlet 13b. Two valves 23 and 24 are provided in the connecting line 22. Preferably, these valves 23 and 24 are two-way electromagnetic valves. Finally, so-called flushing valves 25 and 26 are provided upstream of the point at which feed lines 11 and 12 exit the fuel cell 10. Flushing valve 25 is positioned in the hydrogen feed line 11 upstream from the point at which line 22 intersects hydrogen feed line 11. Flushing valves 25 and 26 are preferably two-way electromagnetic valves of which flushing valve 26 positioned in the oxygen feed line 12 is preferably operated manually.

The fuel cell 10 depicted in FIG. 1 is operated as follows. Hydrogen gas and oxygen gas are admitted into the feed lines 11 and 12 respectively using known valving systems, as for example hand valves. Hydrogen gas flows in feed line 11 up to the closed valves 13 and 16, and the oxygen flows into feed line 12 up to the closed oxygen diaphragm valve 14. The two control valves 16 and 18 are opened simultaneously by a mechanically coupled manual actuator device (not shown). Hydrogen gas then flows through control valve 16 into the diaphragm of the hydrogen diaphragm valve 13 via hydrogen control line 15. Hydrogen diaphragm valve 13 opens at an overpressure of about 0.5 bar and allows the flow of hydrogen gas into the fuel cell and into oxygen control line 17 through the open oxygen control valve 18 up to the diaphragm of oxygen diaphragm valve 14. This causes the pressure in the hydrogen chambers (not shown) of the fuel cell as well as the pressure in oxygen control line 17 to rise.

The hydrogen gas pressure building up in the oxygen control line 17 via the open oxygen control valve 18 causes the oxygen diaphragm valve 14 to open at an overpressure of about 0.7 bar. Thereupon oxygen gas whose flow had been delayed in time relative to the flow of hydrogen gas by valve 14, flows into the fuel cell 10 and into its oxygen chambers (not shown). As a result, a fuel cell voltage is built up which then maintains the two control valves 16 and 18 in an open position, since their coils are supplied from the battery voltage. The manual operation of the two control valves 16 and 18 can then be discontinued, and the fuel cell 10 operates automatically.

The switching-off process proceeds as follows. The circuit of the oxygen control valve 18 is interrupted by an electric break contact of the switch or by a response of a monitoring function. Thereupon, valve 18 closes and is transferred into the venting position for the diaphragm of the oxygen diaphragm valve 14. The valve 14 closes at an overpressure of about 0.6 bar, whereby the supply of oxygen to the fuel cell 10 is interrupted. If an electrical load is connected, the oxygen still present in the oxygen chambers of the fuel cell is then used up by means of the hydrogen gas still flowing into the fuel cell as before. As the amount of oxygen in the cell decreases, the fuel cell voltage continues to drop until it reaches a voltage of about 2V, which is the closing voltage of the hydrogen control valve 16. The valve 16 then closes thereby venting the diaphragm space of the hydrogen diaphragm valve 13, and which causes valve 13 to close.

In the event of a pressure drop in the hydrogen feed line 11, caused by an interruption in the flow of hydrogen gas the hydrogen gas pressure is monitored by the structural arrangement described hereinabove. In the aforementioned structural arrangement the dropping hydrogen pressure in the hydrogen feed line 11 and in the hydrogen control line 15 causes the oxygen diaphragm valve 14 to close at an overpressure of about 0.6 bar, this interrupts the flow of oxygen gas to the fuel cell, which prevents oxidative damage to the hydrogen electrode and to the catalyst. The higher closing pressure of the oxygen diaphragm valve 14 as compared to that of the hydrogen diaphragm valve 13 provides that hydrogen gas flow to the cell 10 continues as long as possible when the fuel cell 10 is switched off or the pressure is monitored.

The two valves 23 and 24 positioned in the connecting line 22 are closed when the fuel cell 10 is in the rest position as well as when fuel cell 10 is in the operating condition. If the fuel cell is switched off, or if a safety function responds, both valves 23 and 24 which are pneumatically connected in series, are opened by an electronic control circuit (not shown). Valves 23 and 24 remain open until the fuel cell voltage which drops during the shut-down phase, reaches the closing voltage of the valves 23 and 24. The valves 23 and 24 are opened for a short time in the shut-down phase to provide a means for hydrogen gas, which is still present in fuel cell 10 at full pressure, to flow into the oxygen chambers (not shown). The hydrogen gas flows into the oxygen chambers, because as described above, the oxygen gas pressure in the cell 10 is less than the hydrogen gas pressure during the shut-down phase because of the early closing of the oxygen diaphragm valve 14 and the simultaneous opening of the oxygen flushing valve 26.

After all valves have reached their closing voltage and are closed, a certain amount of hydrogen overpressure prevails in all gas chambers of the fuel cell. This is advantageous, because it eliminates the danger of oxidation of the catalysts and, the danger of flooding the gas chambers with electrolyte liquid. This is significant because flooded gas chambers would make it necessary to first free all gas chambers of the electrolyte liquid by the inflowing gas, at every switching-on process, which would lead to pressure fluctuations that might have a detrimental effect on the asbestos diaphragms in the fuel cell 10.

The reducing valve 21 is subjected to an overpressure of 1 bar from the oxygen control line 17. In the valve itself, this pressure is reduced to an overpressure of about 0.4 bar and fed to the gas chambers of the electrolyte regenerator 20. The reduced gas pressure has the purpose of preventing, as a counterpressure, a unilateral pressure load on the asbestos diaphragms (not shown) of the electrolyte regenerator 20.

What is claimed is:

1. In an improved hydrogen/oxygen fuel cell of the type having a hydrogen gas feed line connected to said cell for the flow of hydrogen gas into said cell, and having an oxygen gas feed line connected to said cell for the flow of oxygen gas into said cell, said hydrogen gas feed line including a hydrogen diaphragm valve positioned therein which controls the flow of hydrogen gas into said cell, with a hydrogen control line for controlling said hydrogen diaphragm valve and a hydrogen control valve for opening and closing said hydrogen control line, and in which said oxygen feed line includes an oxygen diaphragm valve positioned therein which controls the flow of oxygen gas into said cell, with an oxygen control line for controlling said oxygen diaphragm valve, said improvement comprises:

a connection of said oxygen control line to said hydrogen feed line at a point upstream of said hydrogen diaphragm valve, and a downstream of the connection of said hydrogen feed line to said cell, which provides fluid communication between said oxygen control line and said hydrogen feed line;

oxygen control valve positioned in said oxygen control line for opening and closing said oxygen control line;

wherein the opening pressure of said oxygen diaphragm valve is higher than the opening pressure of said hydrogen diaphragm valve.

2. In a fuel cell according to claim 1, wherein a pressure line to an electrolyte regenerator is connected by a reducing valve to the oxygen control line at a point between the oxygen control valve and the connection of the oxygen control line to the hydrogen feed line.

3. In a fuel cell according to claim 1 or 2, wherein a connecting line having at least one valve positioned therein said connecting line providing fluid communication between the hydrogen feed line at the point where said hydrogen feed line exits the fuel cell, and the oxygen feed line at the point where said oxygen feed line enters the fuel cell.

* * * * *